United States Patent [19]

Stover

[11] 3,810,018

[45] May 7, 1974

[54] DISTORTION COMPENSATOR FOR PHASE MODULATION SYSTEMS

[75] Inventor: Harris A. Stover, Cedar Rapids, Iowa

[73] Assignee: Collins Radio Company, Dallas, Tex.

[22] Filed: June 13, 1972

[21] Appl. No.: 262,433

[52] U.S. Cl. ........................ 325/30, 178/67, 178/88, 325/45, 325/48, 325/60, 325/65, 325/148, 325/159, 325/163, 325/184, 325/187, 325/423, 325/472, 325/476, 325/346, 329/122, 329/136, 332/18

[51] Int. Cl. .............................................. H04b 1/00

[58] Field of Search ............ 178/67, 88; 325/30, 45, 325/48, 60, 65, 148, 159, 163, 184, 346, 423, 472, 476; 179/15 BC; 329/122, 136; 332/18

[56] References Cited

UNITED STATES PATENTS

| | | | |
|---|---|---|---|
| 3,141,134 | 7/1964 | Osborne et al. | 325/159 |
| 3,329,900 | 7/1967 | Graves | 325/346 |

*Primary Examiner*—Albert J. Mayer

*Attorney, Agent, or Firm*—Richard W. Anderson; Robert J. Crawford

[57] ABSTRACT

A distortion compensation means for introduction in either the transmitter or the receiver of a phase modulation communication system by introduction into conventional transmitter phase modulators or receiver phase demodulators of a compensating distortion which is added to the distortion normally existing in the system.

8 Claims, 4 Drawing Figures

(PRIOR ART)

DISTORTION COMPENSATOR FOR PHASE MODULATION SYSTEMS

This invention relates generally to improvements in communication systems of the type employing phase modulation and more particularly to a method and means for removing distortion encountered in such systems stemming from intermodulation products resulting from the demodulation process.

BACKGROUND OF THE INVENTION

Phase modulation has been advantageously employed in certain types of communication systems and has for example been widely employed in space programs. It permits the use of saturated power amplifiers in the transmitters which are very efficient.

Demodulation in phase modulation systems is generally accomplished by mixing the received signal with a locally generated carrier which is 90 degrees out of phase with the carrier component of the received signal. Phase locked loops are employed to maintain the desired phase relationship. The mixing produces an output signal which is proportional to the sine of the desired modulation signal rather than the modulation signal itself. For very small phase deviation angles, the sine of the angle is inherently equal to the angle itself and no significant problem exists. However, these very small phase deviations do not make efficient use of the available transmitter power. As a phase modulation system is frequently applied in space programs, the information is applied to a subcarrier and the subcarrier is used to phase modulate the carrier. If only a single subcarrier is used, the principle product of the sine distortion resulting from phase demodulation is the third harmonic of the subcarrier and is readily filtered off. However, when more than one subcarrier is employed, intermodulation components are generated and the problem of filtering then grows appreciably. The addition of each new subcarrier not only contributes some sum and difference frequencies of the subcarrier harmonics with the existing subcarriers and their harmonics, but also contributes sum and differences of its harmonics with sum and difference frequencies that were already present. The number of the intermodulation products grows extremely rapidly as the number of subcarriers is increased.

Thus design efforts towards minimizing intermodulation distortion in phase modulation systems have repeatedly encountered serious problems in selecting particular subcarrier frequencies which selections will prevent the intermodulation products resulting from the demodulation process from falling on or near the frequencies of the desired subcarriers and therefore interfering with the subcarriers. Extensive computer programs have been utilized to select these discretely related frequencies. When the design problem involves the selection of three or four subcarriers, the selection of satisfactory frequencies for the subcarriers becomes nearly impossible unless extremely wide system bandwidths are employed.

DISCUSSION OF PRIOR ART

Efforts to overcome the distortion in phase modulation systems due to the mixing of intermodulation products and the system carrier have as briefly described above included a laborous selection of discretely related frequencies for subcarriers which minimize the interference due to intermodulation products for a particular application by causing such products to occur at frequencies which will produce minimum interference. This solution to the problem generally necessitates the extensive employment of computer programs for frequency selection. Attempts have been made to attack the problem by working on the demodulator. At least one known approach to extending the linearity of the demodulation, although it was not proposed specifically for the purpose of removing distortion of a demodulated signal, is described in the article "Tanlock: A Phase Lock Loop of Extended Tracking Capability," Proceedings National Winter Conference on Military Electronics, Los Angeles, California, pages 396–421, February 1962. The system therein described is relatively complex and quite limited in the degree of linearity provided. Thus, generally, the current state of the art offers little by way of removing the above defined problem in phase modulation communication systems other than the cut and try laborous method of judicious subcarrier frequency selection to minimize intermodulation component distortion. This is quite wasteful of available frequency spectrum.

OBJECTS AND FEATURES OF THE PRESENT INVENTION

Accordingly, the general object of the present invention is to provide a method and means of distortion compensation in phase modulation communication systems.

A more specific object of the present invention is the provision of a method and means for rendering the demodulation process employed in phase modulation communication systems immune from the inherent sinusoidal output characteristic of the demodulated signal which introduces distortion for all but the smallest deviation angles.

Yet a further object of the present invention is the provision of a distortion compensation means for phase modulation systems whereby a completely linear output may be provided from the system receiver demodulator in systems employing relatively large phase deviation angles.

A still further object of the present invention is the provision of a linearity correction means for a phase modulation communication system permitting the employment of multiple subcarriers, each phase modulating the system carrier without the usual generation of intermodulation components of the subcarriers resulting from the nonlinear demodulation process.

The present invention is featured in the inclusion of linearity correcting means at the transmitter in a phase modulated communication system in such a manner that the demodulated intelligence at the receiver in the system is distortion free and is proportional to the modulation intelligence per se rather than a sinusoidal function of same.

The present invention is further featured in the alternative provision of means at the receiver of a phase modulated communication system for introducing a linearity correction factor such that the demodulated intelligence signal is a function of the per se modulation intelligence imposed at the transmitter rather than a sinusoidal function thereof.

BRIEF DESCRIPTION OF THE DRAWINGS

These and other features and objects of the present invention will become apparent upon reading the following description with reference to the accompanying drawings in which.

DEFINITION OF DEMODULATION DISTORTION DUE TO INTERMODULATION PRODUCTS

Figure 1:
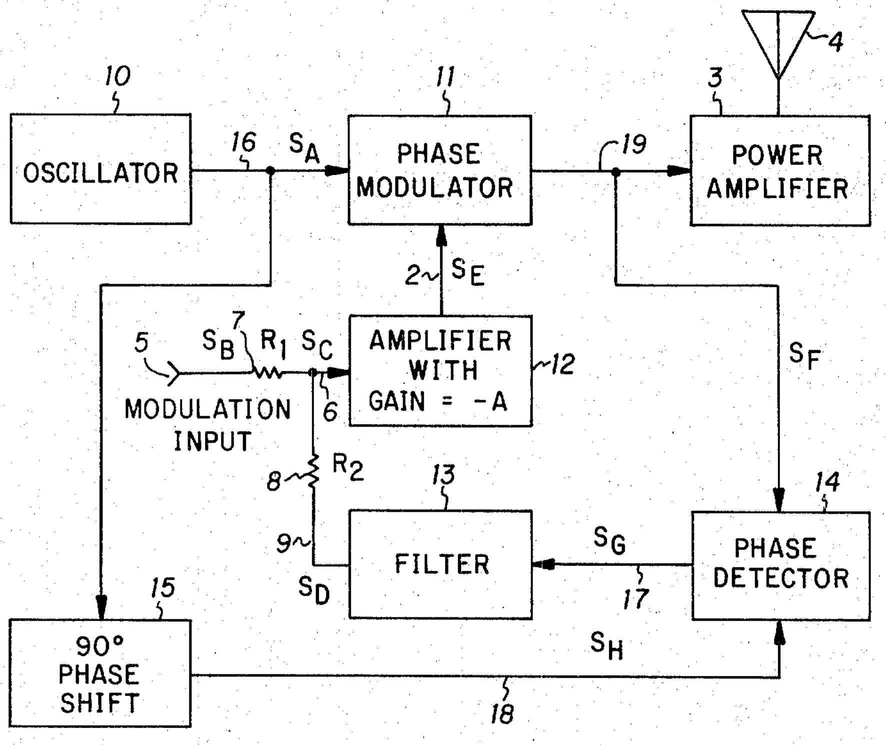
FIG. 1 is a functional diagram of a phase modulation transmitter employing the linearity correcting technique of the present invention.

The following consideration of distortion in phase modulation communication systems is based on a mathematical analysis of distortion occurring in phase modulation systems employing one or more intelligence carrying subcarriers which phase modulate the system carrier. The distortion thus encountered will be treated here in detail since such systems are widely employed and the intermodulation distortion problem inherent in such systems is one of the major disadvantages of employing phase modulation. It is to be emphasized, however, that although the following description of the problem and its solution in accordance with the present invention is discussed in terms of subcarriers, the present invention is useful in compensating for distortion in any linear phase modulation communication system.

As above mentioned, phase modualtion is widely used for a large number of communication applications and has been particularly employed in space programs where it provides several specific advantages. Since phase modulation is an angle modulation system, phase modulation advantageously permits the use of highly efficient saturated amplifiers for the power amplifier of the transmitter. The use of phase modulation obviates potential problems associated with maintaining amplitude linearity throughout the transmitter design. With the commonly employed peak phase deviation used, a carrier frequency component is always available for coherent doppler velocity tracking of a space craft employing such systems. Further in many common applications, telemetry or other information is applied to a subcarrier which phase modulates the carrier. This has become a very convenient and useful practice but it offers one serious disadvantage in giving rise to intermodulation products in the demodulation process.

The present invention will best be comprehended by first considering the intermodulation distortion and the manner in which systems employing multiple subcarriers compound the distortion problem.

In a communication system employing phase modulation, the phase modulator in the transmitter is usually adjusted to make the phase deviation of the transmitted carrier a linear function of the modulating signal so that the transmitted signal $S_T$ may be represented by:

$$S_T = A \cos(\omega_c t + Km(t)), \quad (1)$$

where $A$ is the magnitude of the carrier signal, $\omega_c$ is the angular frequency of the carrier, and $Km(t)$ represents the phase change due to the modulation function $m(t)$.

Demodulation of the phase modulated intelligence at the receiver in a phase modulation communication system is normally accomplished by phase locking a locally generated carrier 90° or $\pi/2$ radians out of phase with the carrier frequency component of the received signal, and mixing the locally generated carrier with the received signal. The locally generated carrier signal $S_R$ may therefore be expressed as:

$$S_R = B \cos(\omega_c t + \pi/2) \quad (2)$$

The output of the mixer (phase detector) in the phase modulation receiver represents the demodulated signal Sd and may be expressed as the product of expressions (1) and (2) as follows:

$$\begin{aligned} Sd = S_T S_R &= A \cos(\omega_c t + Km(t))\, B \cos(\omega_c t + \pi/2) \\ &= (AB/2) \cos(Km(t) - \pi/2) + (AB/2) \cos(2\omega_c t + Km(t) + \pi/2) \\ &= (AB/2) \sin(km(t)) - (AB/2) \sin(2\omega_c t + Km(t)). \end{aligned} \quad (3)$$

In expression (3), the term at the second harmonic of the carrier frequency ($2\omega_c t$) is removed by filtering, leaving only the first term of expression (3). It is to be noted that the demodulated signal of expression (3) does not consist of a constant times the modulation signal as one would wish but instead consists of a constant times the sine function of the product of a constant and the modulating signal.

If the modulating signal $m(t)$ is a single angle-modulated subcarrier, this particular distortion does not cause any serious problem. This may be illustrated by letting $m(t)$ be expressed as:

$$m(t) = C \cos(\omega_s t + \phi(t)), \quad (4)$$

where $\omega_s$ represents the angular frequency of the subcarrier, and $\phi(t)$ represents the information modulated into the subcarrier. When expression (4) is substituted into the expression for the demodulated signal from expression (3), expression (5) is obtained.

$$Sd = (AB/2) \sin(KC \cos(\omega_s t + \phi(t))) \quad (5)$$

Expression (5) neglects the second harmonic of the carrier.

The right hand side of expression (5) may be expanded into a series containing odd harmonics of the desired subcarrier function as illustrated in expression (6).

$$Sd = AB \sum_{n=1}^{\infty} (-1)^{n-1} J_{2n-1}(KC \cos((2n-1)(\omega_s t + \phi(t))) \quad (6)$$

Now, unless the spectrum of $\phi(t)$ is so great that the spectrum of the signal at $\omega_s$ is overlapped by the spectrum at $3\omega_s$, the desired spectrum at $\omega_s$ may be separated from the undesired ones by simple filtering techniques and no serious distortion problem exists.

However, as more subcarriers are added, the problem is seriously increased by the addition of intermodulation products which may result in a self-generated interference problem. This interference problem expands exponentially as the number of subcarriers in the system is increased and becomes extremely serious in a very rapid manner. To illustrate, the demodulated signal expression may be expanded to the inclusion of two subcarriers, $\omega_1$ and $\omega_2$ and, for the convenience of notation, the terms representing modulation of the subcarriers will be dropped. The peak amplitude of the demodulated signal will be represented by $K^1/2$ and the peak phase deviation of the carrier by the subcarriers will be represented by the terms $B_1$ and $B_2$ to arrive at the following:

$$Sd = (K^1/2) \sin (B_1 \cos \omega_1 t + B_2 \cos \omega_2 t) \quad (7)$$

The right-hand side of expression (7) may then be expanded to arrive at:

$$Sd = K^1 \sum_{m=0}^{\infty} \sum_{n=0}^{\infty} J_m(B_1) J_n(B_2) \cos ((m\omega_1 + n\omega_2)t), \quad (8)$$

when $m + n$ is odd.

$Sd = 0$ when $m + n$ is even.

It may then be noted, by comparing expression (8) with expression (6), that the addition of a second subcarrier has not merely doubled the number of frequency components, but has added an infinite number for each of the ones that existed for the case of a single subcarrier. The order of this infinite number of subcarriers increases as the number of subcarriers is increased. While expression (8) may be written in general form to represent any number of subcarriers, it is believed to be sufficiently illustrated above that an intermodulation problem exists when multiple subcarriers are used without considering the additional complicated expression. The problem increases rapidly because, as more subcarriers are added, there are more multiples of more subcarriers that can add and subtract to create intermodulation frequencies. The problem arises because the demodulation process provides as an output signal the sine function of the desired intelligence signal rather than the desired signal itself (reference is made to the general expression (3) ).

GENERAL STATEMENT OF SOLUTION

While at first it would seem natural to attack the above-defined problem by concentrating on the demodulator in the receiver, such approaches the purpose of which is to extend the linearity of the demodulation have generally not been completely successful and in general are relatively complex.

The present invention deals with a relatively simple method of removing the problem either at the transmitter or at the receiver. The ensuing discussion will treat in detail a method of removing the problem at the transmitter followed by a discussion of how the same method may be extended for application to the receiver if certain conditions are imposed. When the technique to be described is applied at the transmitter of a phase modulation communication system the method will always provide adequate linearity to remove the problem. The method whether applied to the transmitter or receiver might be considered to comprise the generation of a type of compensating distortion which is added to compensate for the distortion that the system already has.

Although the distortion is attributable to the receiver demodulator, correction is preferred in the transmitter modulator where it has the advantage of correcting for any nonlinearity in the transmitter modulator as well as the nonlinearity in the receiver demodulator. When applied to the receiver, the technique to be described no longer fully corrects the transmitter modulation nonlinearities.

DETAILED DESCRIPTION OF TRANSMITTER COMPENSATION EMBODIMENT

With reference to FIG. 1, oscillator 10, phase modulator 11 and the modulation signal input 5 to phase modulator 11 may be considered to constitute a basic phase modulated transmitting system. The output 16 from oscillator 10 is applied as a carrier wave input to phase modulator 11. The modulation input 5 might comprise either a single modulating waveform or one or more subcarriers each carrying a channel of modulation. The output 19 from phase modulator 11 is conventionally applied to a power amplifier 3 for subsequent application to transmitting antenna 4.

The lower portions of FIG. 1 represent the manner in which a modulation correction circuitry in accordance with the present invention is added to and integrated with the basic phase modulator transmitter system to compensate for distortion normally generated by the receiver demodulation process in a phase modulation communication system.

As generally stated above, the distortion compensation offered by the present invention comprises the introduction into conventional phase modulation systems of a type of compensating distortion which is added to compensate for the distortion normally existing in the system.

Figure 2:
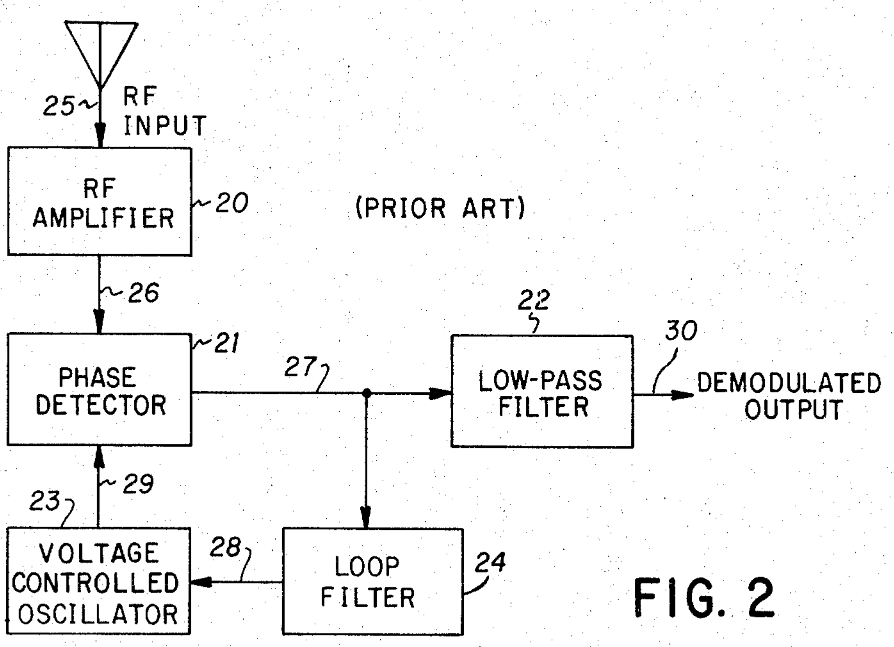
FIG. 2 is a general functional diagram of the basic receiver demodulation technique employed in the phase modulation art.

With specific reference to FIG. 2, the receiver in a phase modulation communication system generally comprises a means for generating a reference carrier at the receiver which is phase locked 90° out of phase with the received carrier. The received carrier and the internally generated carrier are applied to the phase detector for demodulation purposes. This demodulation means, with reference to expression (3) above, has been seen to provide an output from the phase detector which is a sinusoidal function rather than a linear function of the modulating signal imposed on the received carrier. The above discussion has further dealt with the excessive distortions encountered when subcarriers are employed in multiple at the transmitter for modulation purposes.

Now with reference to FIG. 1, the compensating technique in accordance with the present invention is provided by a demodulating means at the transmitter employing a phase detector similar to that employed at the receiver, and a means for combining the demodulated signal at the transmitter with the modulation input signal per se prior to application to the transmitter phase modulator, such that the system transmits a phase modulated waveform with modulation characteristic purposely distorted in a manner which will be ultimately compensated for by the distortion characteristics of the detection system at the receiver.

With reference to FIG. 1, oscillator 10 generates the carrier frequency $\omega_c t$ which is modulated in phase by modulator 11. The output 19 of the phase modulator 11 supplies the rf signal for application to the transmitter power amplifier 3 for transmission, and, additionally, a portion of the output 19 from phase modulator 11 is applied to a phase detector 14. Phase detector 14 is similar to the phase detector employed in the communication system receiver for recovery of the modulation signal. Phase detector 14 receives a second input 18 in the form of the carrier signal 16 from oscillator 10 phase shifted 90 degrees through phase shifter 15. The output 17 of the detector 14 is filtered by filter 13 to remove the radio frequency components such that the output 9 from filter 13 comprises only the demodulated output. Demodulated output 9 from filter 13 is utilized in accordance with the present invention as a feedback signal and is combined with the input modulation signal 5 in the resistive network comprised of resistors 7 and 8. The output 6 of the resistor combining network is applied to an amplifier 12. Amplifier 12 is a negative gain amplifier with gain −A and the output 2 from negative gain amplifier 12 is applied as the modulating input signal to the transmitter phase modulator 11.

Letter designations $S_A$, $S_B$, $S_C$, $S_D$, $S_E$, $S_F$, $S_G$ and $S_H$ in FIG. 1 designate the signals at various points within the circuitry of FIG. 1.

The function of the circuitry of FIG. 1 will be better understood after a consideration and discussion of these various signals and their relationships. For purposes of explanation, arbitrary constant K1, K2, K3, etc. will be used in the mathematical relationships as they relate to these various signals. In actual application of the technique, known or selected values would be used for these constants.

Carrier output 16 from oscillator 10 may be expressed as:

$$S_A = K_1 \cos(\omega_c t) \text{ Output of Oscillator} \quad (9)$$

The system modulation input 5 may be expressed as:

$$S_B = K_2 m(t) = \text{Modulation Input} \quad (10)$$

Assuming that the input impedance of amplifier 12 is sufficiently high that it (the input) draws negligible current, the input 6 to the negative gain amplifier 12, which has been defined as a combination of the modulation input signal 5 and the demodulated signal from filter 13 as applied to the resistive network, may be expressed as:

$$S_C = [R_2 S_B/(R_1 + R_2)] + [R_1 S_D/(R_1 + R_2)] = \text{Input to amplifier} \quad (11)$$

The demodulated output from filter 13 is definable as the input to filter 13 with rf components removed and may be accordingly expressed:

$$S_D = S_G \text{ with r.f. components removed} \quad (12)$$

The output 2 from the negative gain amplifier 12 is definable as the input 6 to the amplifier multiplied by the gain of the amplifier and may accordingly be expressed as:

$$S_E = -A S_C \quad (13)$$

The output signal 19 from the phase modulator 11 is comprised of the carrier input signal 16 phase modulated by the output 2 of the negative gain amplifier 12 and accordingly may be expressed as:

$$S_F = K_3 \cos(\omega_c t + K_4 S_E) = \text{Output signal} \quad (14)$$

The output of phase detector 14 is definable as the product of the inputs thereto and thus may be expressed as:

$$S_G = S_F S_H = \text{Output of phase detector} \quad (15)$$

The output 18 from the 90° phase shifter 15 is definable as the output from oscillator 16 shifted in phase of 90° and accordingly may be expressed as:

$$S_H = K_1 \cos(\omega_c t + \pi/2) \quad (16)$$

The output 17 from phase detector 14, defined in expression (15) above as the product of expressions (14) and (16) may accordingly be expressed as:

$$S_G = K_5 \cos(K_4 S_E - \pi/2) + K_5 \cos(2\omega_c t + K_4 S_E + \pi/2) \quad (17)$$

The output 9 from filter 13 was defined as the filter input with the radio frequency components removed and thus becomes expression (17) with the second, higher frequency term, removed; and may be expressed as:

$$S_D = K_6 \cos(K_4 S_E - \pi/2) = K_6 \sin(K_4 S_E) \quad (18)$$

The output 2 from the negative gain amplifier 12 may accordingly be expressed as:

$$S_E = (1/K_4) \sin^{-1}(S_D/K_6) \quad (19)$$

From the interrelationships defined in expressions (9) - (19), the following relationships are determined:

$$S_C = (-1/AK_4) \sin^{-1}(S_D/K_6)$$
$$= (-S_D/AK_4K_6) - (S_D^3/6AK_4K_6^3) - \text{(Small higher order terms)}$$
$$= [R_2 S_B/(R_1 + R_2)] + [R_1 S_D/(R_1 + R_2)] \quad (20)$$

$$S_D = \left[\frac{R_1}{R_1+R_2} + \frac{1}{AK_4K_6}\right]^{-1} \left[\frac{-R_2S_B}{R_1+R_2} - \frac{S_D^3}{6AK_4K_6^3} \cdots - \text{Other small higher order terms}\right] \quad (21)$$

$$S_D = \frac{AK_4K_6(R_1+R_2)}{AK_4K_6R_1+R_1+R_2} \frac{R_2S_B}{R_1+R_2} - \frac{S_D^3}{6AK_4K_6^3} - \text{Higher order terms} \quad (22)$$

$$S_D = \frac{-AK_4K_6R_2S_B}{AK_4K_6R_1+R_1+R_2} - \frac{R_1R_2S_D^3}{6K_6^2(AK_4K_6R_1+R_1+R_2)} - \frac{\text{Small higher order terms}}{AK_4K_6R_1+R_1+R_2} \quad (23)$$

Considering now expression (23), which defines the output from the filter 13 only the first term on the right hand side of expression (23) contains the gain of the amplifier 12 in the numerator, while all terms in expression (23) contain the gain of the amplifier in the denominator. Therefore, as the gain A is allowed to increase, all of the terms in expression (23) with the exception of the first term, become negligently small, and the first term is reduced to $R_2S_B/R1$. Thus, when the gain A is very large, and substituting expression (10) for $S_B$, the expression for $S_D$ as defined in expression (23) may be written as follows:

$$S_D = R_2K_2m(t)/R_1 \quad (24)$$

Examination of expression (24) reveals that the modulation signal obtained at the output of filter 13 in the transmitter configuration of FIG. 1 is a function of the modulating signal $m(t)$, per se, and not a sinusoidal function thereof. Since this signal at the output 9 of filter 13 is obtained from a phase detector 14 in a manner similar to the manner in which the received signal is demodulated in the receiver, the signal $S_D$ at the output 9 of filter 13 has a form similar to the form of the demodulated signal in the receiver. Since $S_D$ in the transmitter has had the distortion removed, the distortion has also been removed from the demodulated output in the receiver.

Reference is made to the simplified block diagram of a typical phase modulation receiver for use with the transmitting system of FIG. 1 as illustrated in FIG. 2. The distortion compensation technique applied to the transmitter removes the distortion that normally appears in the demodulated output of the receiver and, therefore, removes the problem of the intermodulation products. With reference to FIG. 2, the receive signal 25 is applied to an rf amplifier 20 the output 26 of which is applied as the first input to the receiver phase detector 21. The receiver comprises a phase locked loop wherein the output 27 from the phase detector 21 is applied to a loop filter 24 to supply an output 28 to a voltage controlled oscillator 23. Oscillator 23 generates an output signal 29 which comprises an internally generated carrier component of the signal received. This internally generated carrier signal is conventionally locked 90 degrees out of phase with the carrier component of the received signal as it appears at output 26 of the rf amplifier 20. Thus the output of phase detector 21 in FIG. 2 in the receiver is of the same form as the output of phase detector 14 in the transmitter of FIG. 1. The output 27 from phase detector 21 of FIG. 2 is applied through an additional filter 22 to provide the demodulated output 30. Filter 22 removes the radio frequency components from this output so that the output 30 of filter 22 of FIG. 2 is the demodulated output signal of the receiver and has the same form as the output of filter 13 in the transmitter (FIG. 1). Since the output of filter 13 in the transmitter is free of distortion and intermodulation products of the subcarrier which might be employed in the modulation scheme, the output from filter 22 in the receiver will likewise be distortion free and free of intermodulation products.

It might further be noted that the distortion compensation means as employed in the transmitter of a phase of modulation communication system corrects, in addition to the nonlinearity occurring in the phase detector used for demodulation, for any nonlinearity in the transmitter phase modulator.

RECEIVER EMBODIED DISTORTION COMPENSATION

The above described modulation correction as applied to the transmitter may be extended techniquewise to a receiver embodiment. For the purpose of discussing the application of the technique to the receiver, the assumption is made that the phase modulator in the transmitter is perfectly linear, that is, the phase deviation of the carrier occurring in the phase modulator in the transmitter is precisely proportional to the modulator input signal and the only distortion occurring is that caused by the phase detector in the receiver in producing the sine function of the modulation signal instead of the signal per se.

Figure 3:
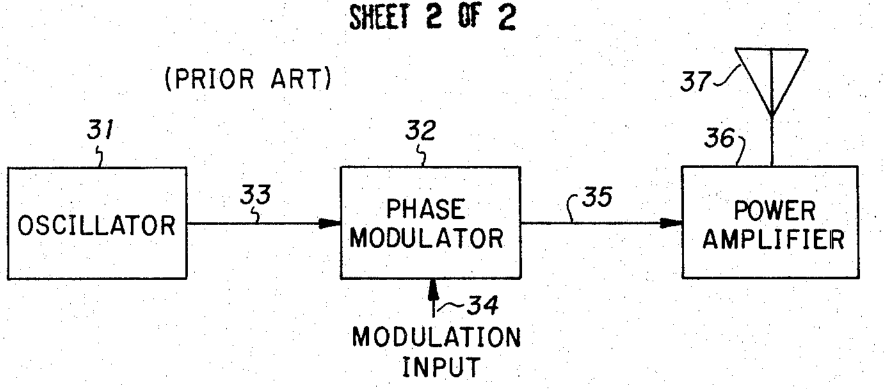
FIG. 3 is a functional representation of the basic phase modulation transmitter employed in the art.

FIG. 3 depicts a general transmitting system known in the art wherein an oscillator 31 applies a carrier signal 33 to a phase modulator 32. Modulator 32 receives the modulation signal input 34 and develops a phase modulated carrier output 35 for application to power amplifier 36 and transmitting antenna 37.

Again, the assumption is made that the phase modulator 32 in the transmitter is linear with the only distortion introduced being that caused by the inherent receiver phase detector characteristic of producing the sine function of the modulation signal instead of the signal itself.

Figure 4:
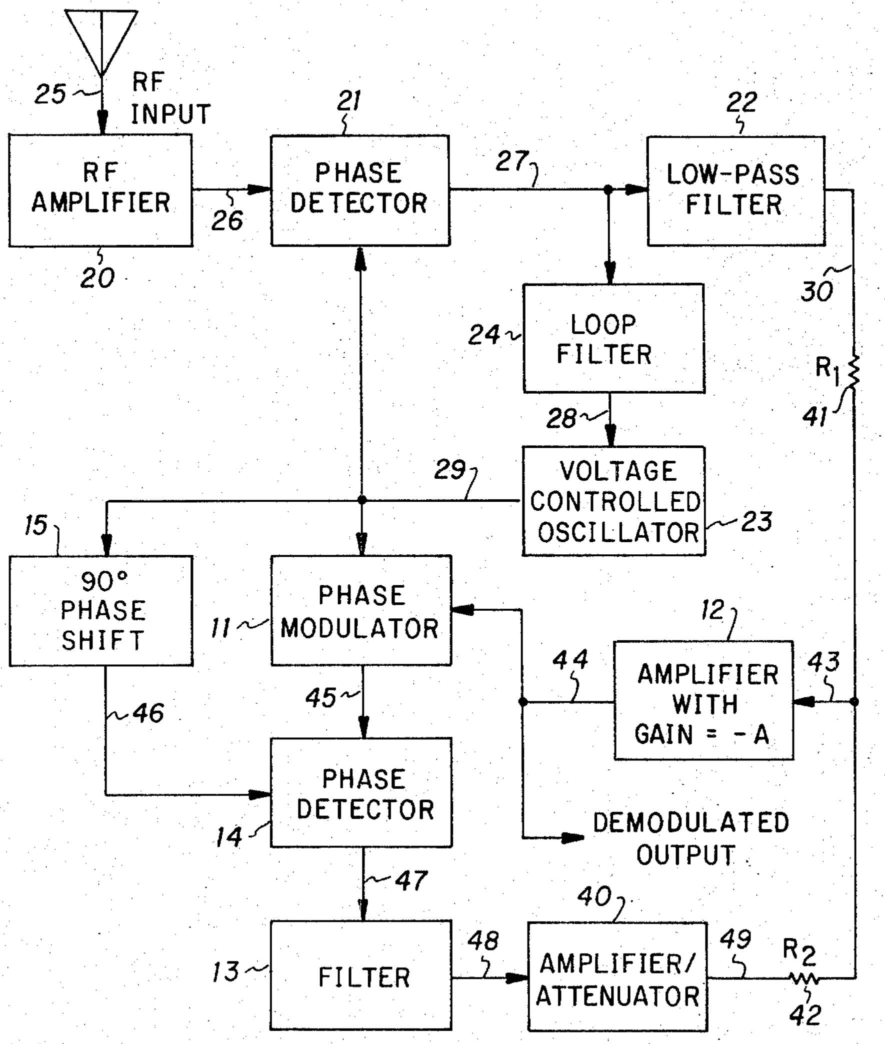
FIG. 4 is a functional block diagram of a phase modulation receiver employing the linearity correcting technique of the present invention.

A receiver modified for distortion compensation in accordance with the present invention is depicted functionally in FIG. 4. FIG. 4 is comprised of functional blocks performing functions similar to those performed by blocks in previously discussed FIGS. 1 and 2 and blocks performing similar functions are similarly referenced in FIG. 4. The upper portion of the receiver of FIG. 4 comprises essentially the standard phase modulation receiver identified as prior art in FIG. 2. The received rf signal 25 is applied to an rf amplifier 20 which provides a signal 26 for application to phase detector 21. The other input 29 to phase detector 21 comprises an internally generated carrier signal locked 90° out of phase with respect to the received carrier signal. Accordingly, the circuitry comprises a phase locked loop wherein the output 27 from the phase detector is applied to a loop filter 24. The output 28 from filter 24 is applied as a controlling voltage to a voltage control oscillator 23 and the output 29 from the oscillator 23 comprises the internally generated phase locked carrier.

The remaining circuitries of FIG. 4 depict a modification to arrive at distortion compensation utilizing essentially the technique applied to the transmitter in the embodiment of FIG. 1.

The output 30 from filter 22 (the conventional receiver output) does not itself comprise the demodulated output of the improved receiver. Rather, the output 30 from filter 22 is applied to a mixing network comprised of resistors 41 and 42. The output 43 from the mixing network is applied as input to a negative gain amplifier 12 having a gain of −A. The output from amplifier 12 is again applied as modulating signal input to a phase modulator 11 the other input 29 of which comprises the internally generated carrier signal 29. The output 45 from phase modulator 11 is applied as a first input to a phase detector 14. The second input to phase detector 14 comprises the output 46 of a 90 degrees phase shifting network 15 to which the internally generated carrier signal 29 from the voltage control oscillator 23 is applied. The output 47 of phase detector 14 is applied to a filter 13 the output 48 of which is applied to an amplifier/attenuator network 40. The output 49 from the amplifier/attenuator network 40 is applied as the second input to the combining network comprised of resistors 41 and 42. Thus the signal 43 applied to amplifier 12 constitutes the combined outputs from filter 22 and amplifier/attenuator 40. The output 44 from negative gain amplifier 12 comprises the distortion corrected receiver output signal.

The technique applied to the receiver in the embodiment of FIG. 4 parallels that of the technique as applied to the transmitter of FIG. 1, only that the FIG. 4 receiver embodiment introduces a phase demodulation compensation and employs a phase modulator similar to and having the same distortion characteristics as phase modulator 11 utilized in the transmitter.

It may be noted from expression (19) above that the output of amplifier 12 is equal to a constant times the arcsine of a constant times the output of filter 13. In expression (24) it is shown that the output from filter 13 is a constant times the desired modulating signal. Therefore, the signal appearing at the output of amplifier 12 in FIG. 4 is a constant times the arcsine of the product of a constant and the modulation input signal. In FIG. 4 the amplifier/attenuator 40 has been added to make this last constant equal to unity. The modulation input in FIG. 4 is the output from filter 22 which is the demodulated output of a normal phase modulation receiver and this output, as above discussed, is proportional to the sine of the desired modulation function. Therefore, the output from amplifier 12 in FIG. 4 becomes a constant times the arcsine of the sine of the desired modulation function. Since the arcsine of the sine of any function is equal to the function itself, the output 44 in FIG. 4 will be a constant times the desired modulation function without the normal sine function distortion normally encountered in phase modulation systems.

SUMMARY

A technique and application of same for removing the normal sine distortion associated with phase modulation communication systems has been described. The application of the technique and implementation thereof to either the transmitter or the receiver in a phase modulation communication system have been described. In general, application of the technique of the transmitter might be considered preferable because the application becomes somewhat simpler and easier to control as applied to the transmitter. Also, when the technique is applied to the transmitter, it corrects nonlinearity in the transmitter phase modulator, while when applied to the receiver, it is preferable to have linear phase modulators in both the transmitter and receiver or at least to have complimentary nonlinearities both places if they do in fact exist.

A further advantage of employing the compensation technique in the transmitter rather than the receiver is that a nearly noise free signal is available in the transmitter while all of the communications noise could cause undesirable effects when the correction is applied to the receiver.

Although the present invention has been described with respect to particular embodiments thereof, it is not to be so limited as changes might be made therein which fall within the scope of the invention as defined in the appended claims.

I claim:

1. A phase modulation communication system with distortion compensation, comprising signal transmitting means; said signal transmitting means comprising a source of rf carrier signal, a phase modulator, a modulating signal, said phase modulator receiving said rf carrier signal and said modulating signal as inputs thereto and providing a phase modulated carrier output signal for transmission; signal receiving means, said signal receiving means comprising a receiver phase detector receiving said phase modulated carrier signal as a first input thereto, means for generating a carrier signal phase locked 90 degrees with respect to said received carrier signal and applying said generated carrier signal as a second input to said receiver phase detector, the output of said receiver phase detector comprising a selectively filterable signal component which is a function of said modulating signal; means for distortion compensation in said communications system comprising means at said transmitter for generating a modulation feedback signal in response to the output of said transmitter phase modulator, said means for generating comprising a further phase detector with characteristics like that of said receiver phase detector receiving the output from said phase modulator and said rf carrier signal shifted 90 degrees in phase as respective inputs thereto and developing an output comprising said modulation feedback signal, a source of modulation intelligence signal, signal combining means receiving said modulation intelligence signal and said modulation feedback signal as respective inputs thereto, negative gain signal amplifying means receiving the output of said signal combining means and developing an output signal comprising said modulating signal.

2. A distortion compensated phase modulation communication system as defined in claim 1 wherein said negative gain amplifier has a gain of −A, where A is substantially greater than the unity.

3. A distortion compensated phase modulation communication system as defined in claim 2 wherein said signal combining means comprises first and second serially interconnected resistors the free ends of which receive the respective modulation intelligence signal and modulation feedback signal inputs and the junction between which comprises the output from said signal combining means.

4. A phase modulation communication system with distortion compensation comprising signal transmitting means; said signal transmitting means comprising a source of rf carrier signal, a phase modulator, a modulating signal, said phase modulator receiving said rf carrier signal and said modulating signal as respective inputs thereto and providing a phase modulated carrier output signal for transmission; signal receiving means, said signal receiving means comprising a receiver phase detector receiving said phase modulated carrier signal as a first input thereto, means for generating a carrier signal phase locked 90 degrees with respect to said received carrier signal and applying said generated carrier signal as a second input to said receiver phase detector, the output of said receiver phase detector comprising a selectively filterable signal component which is a function of said modulating signal; means for distortion compensation in said communication system comprising means at said receiver, including a further phase modulator with characteristics like that of said transmitter phase modulator receiving said generated carrier signal as a first input thereto, signal combining means, means applying said output of said receiver phase detector as a first input to said signal combining means, the output from said signal combining means applied to a negative gain amplifying means, the output of said negative gain amplifying means comprising a second input to said further phase modulator, said generated carrier signal and the output from said further phase modulator being applied to a means for phase detecting, signal translating means receiving the output from said means for phase detecting and applying a second input to said signal combining means, and the output from said negative gain amplifying means comprising the modulation component of said received phase modulated carrier signal as a linear function of said modulating signal.

5. A phase modulation communication system with distortion compensation as defined in claim 4 wherein said means for generating said receiver generated carrier signal comprises a phase locked loop, said phase locked loop comprising a loop filter to which the output from said receiver phase detector is applied, the output from said loop filter being applied to a voltage controlled oscillator, and the output of said voltage controlled oscillator comprising said generated carrier signal.

6. A distortion compensated phase modulation communication system as defined in claim 4 wherein said signal translating means translates the signal input thereto with a predetermined gain factor, the output signal from said negative gain amplifying means being defined as a constant times the arcsine of the product of a further constant times the output of said receiver phase detector, said last named constant being established as a value of unity in response to said predetermined gain factor.

7. A distortion compensated phase modulation communication system as defined in claim 4 wherein said negative gain amplifer has a gain of −A, where A is substantially greater than unity.

8. A distortion compensated phase modulation communication system as defined in claim 4 wherein said signal combining means comprises first and second serially interconnected resistors the free ends of which respectively receive the output of said receiver phase detector and the output from said means for phase detecting, and the junction between which comprises the output from said signal combining means.

* * * * *